June 16, 1953 J. MOFENSON 2,642,532
ELECTRON DISCHARGE CIRCUITS
Filed Sept. 30, 1949
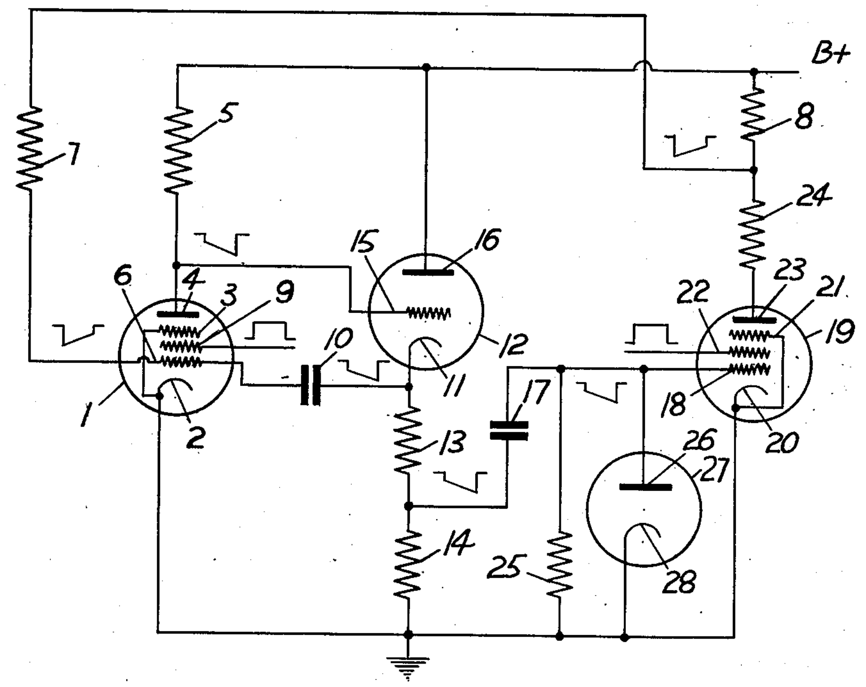
INVENTOR
JACK MOFENSON
BY
ATTORNEY Patented June 16, 1953

2,642,532

UNITED STATES PATENT OFFICE 2,642,532

ELECTRON DISCHARGE CIRCUITS

Jack Mofenson, Medford, Mass., assignor to Raytheon Manufacturing Company, Newton, Mass., a corporation of Delaware Application September 30, 1949, Serial No. 118,786

8 Claims. (Cl. 250—36)

This application relates to electron discharge circuits employing negative feedback, and particularly to devices wherein the negative feedback path comprises a capacitance.

In a discharge circuit such as, for example, an amplifier, it is impossible for a negative feedback signal to exceed the input signal to the amplifier since the fed back signal, being out of phase with the input signal, will subtract therefrom such that the effective signal applied to the amplifier input will be the input signal minus the fed back signal. This difference must be positive in order to produce any output signal at all, said output signal being equal to this effective signal multiplied by the gain of the amplifier. The result is that the effective signal developed across the input impedance will vary in proportion to the above-described combination of the output signal and the input signal.

This becomes important when the impedance of the feedback path varies with respect to time or frequency as is the case when a reactive component is used therein. An example of this is found in sawtooth generators using the so-called Miller rundown circuit which may take many forms and is described in detail in Chapter 2 of volume 19 entitled "Waveforms" of the Massachusetts Institute of Technology Radiation Laboratory Series published by the McGraw-Hill Book Company, Inc., in 1949. In its simplest form this circuit comprises a phase-inverting amplifier having an input and output and a condenser connecting said input and output. When used as a sweep circuit for producing a linear sawtooth output voltage, the input is connected through a resistive impedance to a constant voltage reference level. When the amplifier is then turned on, as, for example, by a square pulse applied to any desired electrode, for example, an auxiliary electrode such as a screen grid, the voltage applied to the grid, after the initial surge, will vary as a function of the discharge of the condenser.

If it is desired that this voltage variation be linear, it is necessary that the current flow into the condenser be constant and, therefore, the voltage drop across the input resistor be constant. However, there will be a change in the voltage across the resistor because of the change in voltage of the grid and this change will change the current flow into the condenser producing a non-linearity in the sawtooth waveform.

Applicant has discovered that, by substituting a varying voltage level for the constant voltage level to which the grid input resistor is tied, with the variations of said voltage level conforming to the same waveform as that appearing on the grid, a constant voltage drop may be produced across the grid input resistor and hence a constant current flow into the condenser with a resultant linear sawtooth output.

By way of example, this voltage reference level may be varied by tieing it to the output of a second phase-inverting amplifier fed by the output of the first sawtooth generating amplifier. This, in effect, compensates for the difference between the input and feedback voltages, in this case the input voltage being the condenser discharge voltage and the feedback voltage being the variation of the output of the device.

The particular details of a species of this invention are illustrated in the single figure of the drawing which represents a schematic diagram of a circuit using this invention.

Referring now to the drawing, there is shown a sawtooth generator comprising a Miller feedback tube 1 shown here, by way of example, as a pentode. The cathode 2 and suppressor grid 3 of tube 1 are grounded. The anode 4 of tube 1 is connected to a source of positive potential B+ through a load resistor 5. The grid 6 is connected through a voltage divider network comprising resistors 7 and 8 to a source of positive potential. The screen grid 9 is connected to a source of positive rectangular gating pulses.

The grid 6 is also connected through a condenser 10 to the cathode 11 of a cathode follower tube 12, said cathode 11 being also connected to ground through a voltage divider netork comprising resistors 13 and 14. The grid 15 of cathode follower 12, which is shown here, by way of example, as a triode, is connected directly to the anode 4 of tube 1. The anode 16 of tube 12 is connected directly to a source of positive potential B+.

The junction between resistors 13 and 14 is connected through a coupling condenser 17 to the grid 18 of a phase-inverting amplifier tube 19. The cathode 20 and suppressor grid 21 of amplifier 19 are connected to ground. The grid 22 of amplifier 19 is connected to a source of rectangular gating pulses. The anode 23 of amplifier 19 is connected through a voltage dividing resistor 24 to the junction between resistors 7 and 8. The grid 18 of tube 19 is connected to ground through a grid-leak resistance 25 and to the plate 26 of a clamping diode 27 whose cathode 28 is grounded.

Normally, in the absence of a positive pulse on screen grid 9 of tube 1, the grid 6 is maintained at substantially zero voltage by drawing grid current from the cathode 2, said grid current flowing through resistors 7 and 8 to produce a drop thereacross substantially equal to the positive potential. The anode 4, since it draws no current, is at the potential of the source. When a positive pulse is applied to screen grid 9, tube 1 conducts heavily producing a drop across resistor 5. This drop is applied to the grid 15 of the cathode follower 12, and appears on the cathode 11 thereof. The drop is fed from the cathode 11 of the tube 12 to the grid 6 of the tube 1 through condenser 10 thereby driving the grid negative to a point where plate current is sufficiently decreased to produce a condition of equilibrium. Since the grid 6 is now negative, it no longer draws grid current and the current producing an IR drop in resistor 7 comes from a discharge of condenser 10 through resistors 7 and 8 to B+ and through the B+ power supply and the resistors 14 and 13 of tube 12. As previously stated, the rate at which condenser 10 discharges varies directly with the current through resistor 7 and, therefore, with the voltage across resistor 7. As the condenser 10 discharges, the grid 6 becomes more positive thereby producing a sawtooth waveform. This continues until the end of the pulse applied to the screen grid 9 or until the grid 6 reaches saturation at a near zero potential.

It is to be clearly understood that the condenser 10 could be connected directly to anode 4, and the cathode follower 12 thereby eliminated. However, by the use of cathode follower 12 a rapid recharging of the condenser 10 may be accomplished upon termination of the sawtooth pulse through the relatively low resistance of tube 12 to the high potential supply whereas, if the condenser 10 were connected to the anode 4, it would have to recharge through the load resistor 5, which would take a somewhat longer time. The result is that by the use of cathode follower 12 a higher repetition rate of the sawtooth pulses may be obtained.

In order to maintain the voltage across resistor 7 constant, the end thereof which is not tied to the grid 6 is connected to the output of amplifier 19 which produces a waveform exactly the same as the waveform applied to grid 6 of tube 1.

This is accomplished as follows: The tube 19 is normally cut off, due to a lack of voltage on the screen grid 22. A positive pulse is applied to the screen grid 22 coincidental with the application of the pulse to screen grid 9 of tube 1. This causes the tube 19 to conduct heavily causing a large negative output to appear at anode 23. In addition, a sawtooth waveform is applied to the grid 18 of tube 19 from cathode follower 12 thereby producing a sawtooth output on anode 23. These two waveforms add algebraically to produce the same waveform as that found on grid 6, and this waveform is applied to the resistor 7. The result is that resistor 7 has, at all times during the generation of the sawtooth waveform, a constant voltage maintained thereacross. This results in a constant current charging of condenser 10 with the resultant linear sawtooth.

The diode 27 acts as a clamping device preventing the grid 18 from going positive, for example, due to discharges and charges of coupling condenser 17, thereby maintaining a constant reference level for the application of pulses to the grid 18 of amplifier 19 with the result that the pulse output of amplifier 19 may be made to accurately conform to the pulse appearing on grid 6. By adjusting the values of resistors 13 and 14, and 8 and 24, the relative magnitudes of the pulses applied to the screen 22 and the grid 18 may be adjusted and their over-all magnitudes adjusted to produce a pulse of exactly the same magnitude as the pulse applied to grid 6.

It is to be clearly understood that this circuit is by way of illustration only and that all circuits utilizing negative feedback through a capacitance to produce a linear sweep may have added thereto the additional compensation produced by connecting the grid input impedance to a varying potential whereby a corrective waveform may be added to the grid input circuit. Indeed, it is not necessarily limited to devices utilizing capacitive feedback but may be used in other negative feedback circuits. Therefore, applicant does not wish to be limited to the specific details of the embodiment of the invention described herein except as defined by the appended claims.

What is claimed is:

1. An electron discharge system comprising an electron tube having an anode, a cathode, and a grid, an impedance connected between said anode and said grid, a discharge path for said grid comprising an impedance, and a potential source coupled to the output of said system which varies as a function of said output and which is coupled to said impedance for maintaining a constant voltage drop across said impedance.

2. An electron discharge system comprising an electron tube havng an anode, a cathode, and a grid, a reactive impedance connected between said anode and said grid, a discharge path between said grid and a potential reference, said discharge path comprising an impedance, and a potential source coupled to the output of said system which varies as a function of said output and which is coupled to said impedance for maintaining a constant current through said impedance.

3. An electron discharge system comprising an electron tube having an anode, a cathode, and a grid, a capacitive impedance connected between said anode and said grid, a discharge path between said grid and a potential reference, said discharge path comprising an impedance, and a potential source coupled to the output of said system which varies as a function of said output and which is coupled to said impedance for maintaining a constant voltage drop across said impedance.

4. An electron discharge system comprising an electron tube having an anode, a cathode, and a grid, a capacitive impedance connected between said anode and said grid, a discharge path for said grid comprising a resistance, and a potential source coupled to the output of said system which varies as a function of said output and which is coupled to said resistance for maintaining a constant current through said resistance.

5. An electron discharge system comprising an electron tube having an anode, a cathode, and a grid, a reactive impedance connected between said anode and said grid, a discharge path between said grid and a potential reference, said path comprising a resistance, and a potential source coupled to the output of said system which varies as a function of said output and which is coupled to said impedance for maintaining a constant voltage drop across said impedance comprising an amplifier fed from said anode.

6. An electron discharge system comprising an electron tube having an anode, a cathode, and a grid, a reactive impedance connected between said anode and said grid, a discharge path between said grid and a potential reference, said path comprising an impedance, and circuitry connected to said impedance for maintaining a constant voltage drop across said impedance comprising an amplifier coupled from said anode through a cathode follower, the output of said amplifier being coupled to said impedance.

7. An electron discharge system comprising an electron tube having an anode, a cathode, and a grid, a capacitive impedance connected between said anode and said grid, a discharge path between said grid and a potential reference, said path comprising an impedance, and circuitry connected to said impedance for maintaining a constant current through said impedance comprising an amplifier for varying said potential reference coupled from said anode, the output of said amplifier being coupled to said impedance.

8. An electron discharge system comprising an electron tube having an anode, a cathode, and a grid, a reactive impedance connected between said anode and said grid, a resistance connected between said grid and a potential reference, said potential reference comprising an amplifier coupled from said anode, the output of said amplifier being coupled to one end of said resistance.

JACK MOFENSON.

References Cited in the file of this patent

UNITED STATES PATENTS

| Number | Name | Date |
|---|---|---|
| 2,280,990 | White | Apr. 28, 1942 |
| 2,412,485 | Whiteley | Dec. 10, 1946 |